United States Patent [19]

Rumball

[11] 4,096,963
[45] Jun. 27, 1978

[54] COMPOSITE LID

[75] Inventor: Kenneth Francis Rumball, Great Bookham, England

[73] Assignee: Airfix Industries Limited, London, England

[21] Appl. No.: 710,222

[22] Filed: Jul. 30, 1976

[30] Foreign Application Priority Data

Jul. 30, 1975 United Kingdom .............. 31954/75

[51] Int. Cl.² ............................................. B65D 41/18
[52] U.S. Cl. .................................. 215/317; 215/324; 428/66; 428/81; 428/157
[58] Field of Search ....................... 428/13, 14, 66, 65, 428/64, 81, 156, 157; 215/316, 317, 324

[56] References Cited

U.S. PATENT DOCUMENTS

| 3,655,493 | 4/1972 | Campbell | 428/38 |
| 3,808,084 | 4/1974 | Doty | 428/66 |
| 3,821,061 | 6/1974 | Schier | 428/66 |
| 3,973,689 | 8/1976 | Sutch | 428/81 |

*Primary Examiner*—William J. Van Balen
*Attorney, Agent, or Firm*—Scrivener, Parker, Scrivener and Clarke

[57] ABSTRACT

A composite product and a method of making the product, the product being a central panel of flexible sheet material having a peripheral molding of plastics bonded to the margin of the panel, the arrangement being such that the margin of the panel is deformed to define two marginal parts displaced out of the plane of the central part of the panel, the moulding extending across the junction of the two marginal parts with each other but stopping short of the junction of the inner marginal part with the central part so that the blank at that junction is free to unwind, i.e. return to the flat and any bowing of the blank, which being uniform as to direction, is substantially less than would be the case were the moulding to cover both junctions.

1 Claim, 1 Drawing Figure

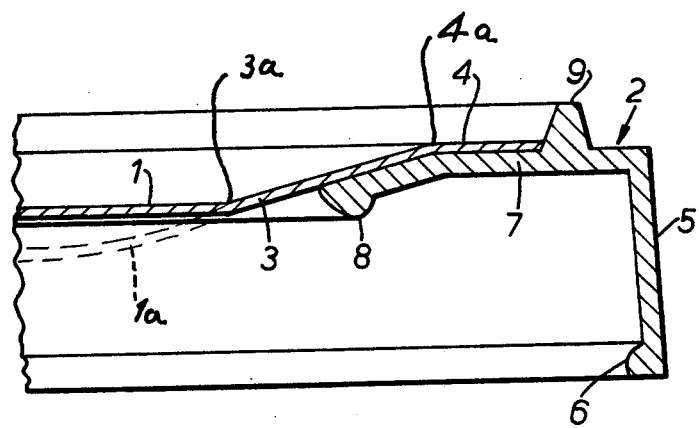

COMPOSITE LID

The present invention relates to improvements in composite products which comprise a piece of flexible sheet material, such as of paper, card, synthetic plastics or metal foil or a laminate thereof, and an injection moulded portion moulded onto the sheet material.

In U.S. Pat. No. 3,956,550 assigned to the same assignee as the present application there is described and claimed a composite closure which comprises a blank of sheet material constituting the closure proper to extend across an opening to be closed, and an injection moulded plastics peripheral moulding bonded to the peripheral margin of the blank and defining a connection for securing the blank relative to a lip defining the opening, the margin of the blank to which the peripheral moulding is bonded being orientated out of the plane of the blank which will extend across the opening when the closure is in position; the plastics moulding having a first portion in a first plane, a second portion in a second plane spaced from and parallel with the first plane and being bonded to the margin of the blank, the portions of the moulding on shrinkage of the moulding remaining substantially in spaced parallel planes while displacing the margin of the blank and inducing bowing of the blank.

In U.S. Pat. No. 3,973,689, assigned to the same assignee as the present application there is described a method of making a composite product in which a peripheral moulding of synthetic plastics material is formed on the margin of and extends about a panel of flexible material, the panel being deformed at the margin to define there a peripherally extending channel internally engaged by an inner marginal part of the moulding from the outer region of which and from the plane of the panel extends a second part of the moulding, shrinkage of the moulding tending to bow the central part of the panel in the direction in which the channel faces.

According to the present invention there is provided a method of making a composite product in which a peripheral moulding of synthetic plastics material is formed on the margin of and extends about the periphery of a panel of flexible material, the panel being generally planar in a central part and deformed at the margin to provide an inner margin extending in a first direction relative to the plane of the central part and an outer marginal part extending generally in a plane parallel with but spaced from the plane of the central part, and the moulding including a first inwardly extending portion bonded to the outer and inner marginal parts on that surface extending from the surface of the central part remote from the outer marginal part and a skirt extending from the first portion in the direction opposite to that in which the blank inner marginal part extends from the blank central part.

In order that the present invention may be well understood there will now be described some embodiments, given by way of example only, reference being had to the accompanying drawing which is a section through the periphery of an embodiment of lid according to this invention.

The figure shows a lid comprising a panel 1 of flexible sheet material, in this case a round panel and a peripheral moulding 2 of synthetic plastics material which is formed on the blank after the blank has been positioned between two mould tools and the tools closed. The margin of the panel 1 is deformed out of the plane of the panel to provide a first inner displaced margin 3 and a second outer displaced margin 4 which is substantially in a plane parallel with the plane of the main portion of panel 1. This displacement is preferably performed by the mould tools during their closing movement the blank having been located, in planar condition, between the tools when they are in the open condition. The injection moulded peripheral rim comprises a skirt 5, which may have any suitable means for attaching the lid to a container such as the bead 6 and an inwardly extending portion 7 bonded to the margins 3 and 4 and overlying the junction 4a between the inner and outer marginal parts of the panel 1. The inner region of the inwardly projecting portion 7 includes a thickened portion 8 formed by a region of the mould cavity with which pin gates for injection of material communicate, that region of the cavity being dimensioned to constitute a preferred flow path circumferentially of the lid which will fill with injected material first and from which the material will flow radially outwardly to the skirt and to a nesting ring 9.

By the construction described in which the injected material only overlies the junction 4a between the inner and outer margins 3, 4 the material of the blank at the junction 3a between the central part and the inner margin is free. Therefore the material of the blank at that junction is free to unwind, i.e. return to the flat. This tendency is also produced by some pivoting of the moulding clockwise as viewed in the drawing, due to shrinkage which will be greater at the extremity of the skirt which is free of the blank and less where the moulding is secured to the blank. Coupled with the overall reduction of area encompassed by the moulding, these tendencies ensure that the central panel will bow downwards as indicated by the broken lines 1a. Because the inner portion of the moulding is not extended to cover the inner junction 3a the quantity of material is reduced as compared with the case where both junctions are covered, and because the inward pivoting of the skirt is now only some 8°, i.e. from an outward angle of 3° upon moulding to say 5° inwards after shrinkage, as compared with some 16° which would be necessary to ensure uniform bowing where both junctions are covered, the skirt can be made of slightly less material and will conform to much closer tolerances. Additionally the material of the blank does not have to be worked so much as where a channel is formed in the periphery of the blank.

What we claim is:

1. A composite lid of given form comprising a blank of flexible sheet material and a peripheral moulding of synthetic plastics material injection moulded in position on the blank and of form following the periphery of the blank, the blank comprising a generally planar central part, an inner marginal part displaced relative to the central part to extend from an inner junction with the central part out of the plane of said central part in a first direction and a generally planar outer marginal part which extends outwardly from an outer junction with the inner marginal part in a plane substantially parallel with and spaced from the plane of said central part, said planar outer marginal part terminating in a free edge part, the moulding comprising an inwardly extending portion abutting and bonded by moulding in position on the blank to the displaced marginal parts of the blank on the faces thereof which are directed away from said first direction, said moulding extending outwardly beyond the free edge part of said blank, said moulding including an integral skirt extending from the outwardly extending part of said moulding in a direction opposite to said first direction, the inwardly extending portion of the moulding overlying the outer junction between the inner and outer marginal parts of said blank but not the inner junction between the inner marginal part and the central part.

* * * * *